May 25, 1926.

A. W. POUGHER 1,585,873

FRONT GLASS FOR VEHICLE LAMPS

Filed Feb. 2, 1925

INVENTOR
ARTHUR WILLIAM POUGHER
PER Rayner & Co
ATTORNEYS

Patented May 25, 1926.

1,585,873

UNITED STATES PATENT OFFICE.

ARTHUR WILLIAM POUGHER, OF YORK, ENGLAND.

FRONT GLASS FOR VEHICLE LAMPS.

Application filed February 2, 1925. Serial No. 6,302.

This invention is an improvement in or modification of the invention claimed in the specification of Patent No. 1,457,393. In this said specification the invention comprised a double or two distinct lenses or front glasses for a head lamp, arranged in front of the source of light, each of the said lenses being formed of a plurality of prisms, disposed so as to allow two concentric beams of light to be projected the inner beam being stronger than the outer. This was effected by providing a central boss portion which did not split up the rays of light and so shaping the surrounding prisms that the rays of light passing therethrough are split up whereby a diffused light is projected. By this means the direct glare of the central beam would only affect approaching persons at a considerable distance owing to the small spread of the central beam, whilst the softened or diffused outer beam serves to illuminate the road at a wider field whereby persons or vehicles within its scope would be visible without being inconvenienced by the light.

I have found after further experiments that by arranging the relationship of the two sets of prisms in a particular manner a more beneficial result is obtained and this arrangement or relationship of the prisms is the characteristic feature of the present invention.

According to this invention, a front glass or lens is provided constituted by two sets of concentric prisms arranged in such manner that the concavities or grooves between the individual prisms of one set align with the median parts of the prisms of the other set, the formation of the complete surfaces of each set being such that two concentric beams of light are projected, the centre being stronger than the outer, the rays of light diverging from the common axis of the two sets of prisms.

The two sets of prisms may be formed upon the two faces of a single piece of glass or a pair of glasses or lenses can be provided each having a set of prisms formed thereon.

The invention will now be described with reference to the accompanying drawings in which:—

Figure 1:
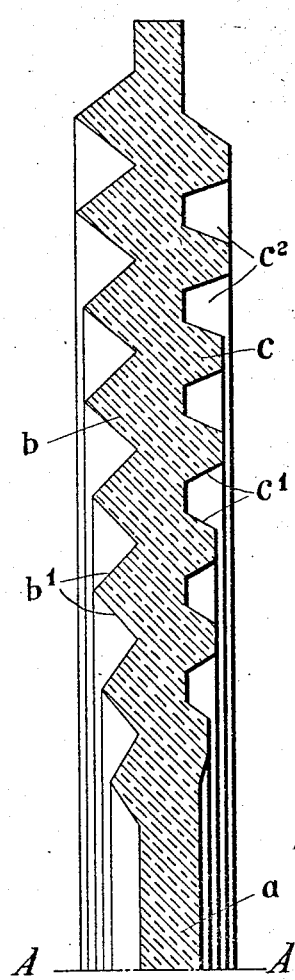
Figure 2:
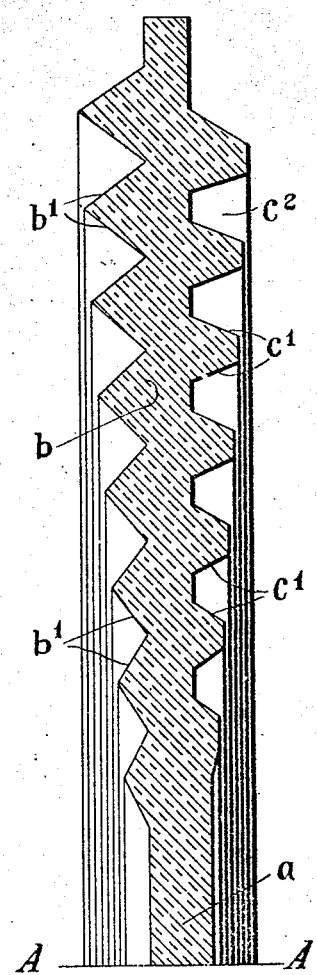

Fig. 1 is a radial section from the focal line or central axis A—A of one form of front glass or lens according to the invention and Fig. 2 is a similar view of another form.

Referring to the drawings, it will be seen that both embodiments have a central boss portion $a$, and it is this portion which allows rays of light to pass through without splitting them up and so enables a strong central and relatively small cross sectional area of beam to be projected. The remaining part of the lamp glass or lens is divided on both faces into a number of annular concentric prisms, the front set $b$ being triangular in section, and the rear set $c$ being truncated. The sloping surfaces $b^1$ and $c^1$ of these prisms have varying angles which approach the horizontal (i. e. parallel with the axis A—A) more in proportion to the distance of the prisms from the axis of the lens. This change in angle of the sloping surfaces $b^1$ and $c^1$ can be effected in a number of ways, the method shown in the drawings being to make the centre lines of the prisms all the same distance apart but to increase the depth of the prisms from the centre prism outwards in succession as shown in Fig. 2 or in a succession of pairs as shown in Fig. 1.

The rear set of prisms $c$ (the set nearer the source of light) receives the rays of light from the source of light and the reflector and splits up the rays of light, the front set of lens $b$ still further breaking up the rays of light. The prisms are so arranged that the actual illuminating rays or beams emitted from the front set of prisms, or what may be termed the live rays, are contained within an angle of approximately 20 degrees and pass through the central portion $a$, whilst the rays outside this angle consist of split up or diffused rays, consequently when two vehicles approach one another from a distance the live rays of one vehicle will be visible to the other, but as the vehicles get closer together, each is cut off from the live rays of the other, whereby whilst each vehicle is visible to the other by means of the diffused rays neither suffers from the dazzling effect of the live rays. Portions of the prisms may be frosted or coated with an opaque substance to intercept live rays whose angle of elevation exceeds a limit so as to restrict the live rays to a zone below the level of the eyes of the road users. The upper portions of some or all of the prisms may be horizontal instead of circular for the same purpose.

A characteristic part of this invention is the relationship of the two sets of prisms. It will be noticed that the spaces or channels $c^2$ of the rear set are aligned with or located on the imaginary lines passing through the apices of the prisms $b$, by this means a more efficient splitting up of the rays is obtained than if the prisms were located exactly opposite each other or in irregular relationship.

The number of prisms may be varied as desired.

I claim:—

1. A front glass for vehicle lamps comprising a set of concentric annular prisms of truncated pyramid section facing in one direction and a set of concentric annular prisms of triangular section facing in the opposite direction, the apices of the triangular sections of the second mentioned set of prisms being disposed in line with the spaces dividing the truncated sections of the first mentioned set.

2. A front glass for vehicle lamps according to claim 1 wherein the depths of the individual prisms increase in proportion to their distances from the centre of the glass.

3. A front glass for vehicle lamps comprising a set of concentric annular prisms of truncated pyramid section, a set of concentric annular prisms of triangular section, the truncated sections of the second mentioned set of prisms being staggered relatively to the triangular sections of the first mentioned set, and a central non-prismatic zone for projecting a beam of light within said prisms.

ARTHUR WILLIAM POUGHER.